Jan. 24, 1928.

A. H. PITNEY 1,657,316

REGISTERING MECHANISM FOR POSTAGE METERS, ETC

Filed July 10, 1923    3 Sheets-Sheet 1

Inventor
Arthur H. Pitney
By Alexander Lowell
Attorneys.

Jan. 24, 1928.

A. H. PITNEY 1,657,316

REGISTERING MECHANISM FOR POSTAGE METERS, ETC

Filed July 10, 1923          3 Sheets-Sheet 3

Inventor

Arthur N. Pitney

By Alexander Lowell Attorneys

Patented Jan. 24, 1928.

1,657,316

UNITED STATES PATENT OFFICE.

ARTHUR H. PITNEY, OF STAMFORD, CONNECTICUT, ASSIGNOR, BY MESNE ASSIGNMENTS, TO PITNEY-BOWES POSTAGE METER COMPANY, OF STAMFORD, CONNECTICUT, A CORPORATION OF DELAWARE.

REGISTERING MECHANISM FOR POSTAGE METERS, ETC.

Original application filed July 12, 1922, Serial No. 574,427. Divided and this application filed July 10, 1923. Serial No. 650,701.

This invention relates to registering mechanism, and is particularly designed for use in the so-called "postage meter" machines of the type shown in my Patents #1,273,793 dated July 23, 1918, Reissue #14,916, dated July 13, 1920; and #1,370,668 dated March 8, 1921.

Such machines are designed for use by persons, firms, or corporations having a large number of letters or packages to mail, to enable such users of the mail to buy any desired amount of prepaid postage from the Government, and print such amount of postage, from time to time, in any quantities and amounts that they desire, until the total amount of postage for which they paid is exhausted, whereupon the machine will become automatically locked so that no further stamps can be printed thereby.

The present invention is a division of my application for postage meters, filed July 12, 1922, Serial #574,427, and the invention herein covered has particular reference to the counting devices or registering mechanisms used in the aforesaid machines, but such registers or counting mechanisms are also adapted for use with other types of machines.

I will explain the invention with reference to the accompanying drawings which illustrate one practical registering mechanism embodying the invention. The invention, however, is capable of various changes in form, construction and combinations of parts within the scope of the invention. An understanding of said mechanism will enable others to adopt and use the invention for various purposes within the scope of the claims, which set forth the essentials of the invention and the novel features of construction and novel combinations of parts for which protection is desired.

In the drawings I have shown the registering mechanism used in connection with a "postage meter" as set forth in the aforesaid parent application, and herein have illustrated and described only such parts of such postage meter machine as is necessary to an understanding of the use of my present invention therewith.

As indicated in the accompanying drawings the meter has a hollow base member 1 upon which is mounted a casing 2 enclosing the counting or registering mechanism. The base 1 preferably is constructed as described in my said application.

Journaled in the base is a shaft 7, to the outer end of which is securely fastened a coupling member 8, and on the inner end of shaft 7 is fixed a pair of spaced pinions 9 and 9ª, connected by a suitable hub as indicated in the drawings. The inner gear 9 meshes with the gear 50ª (see Figs. 3 and 4) attached to the unit wheels 50 of the counting mechanism in the casing as hereinafter described, said counting mechanism being actuated by the rotation of the shaft 7.

Within the casing 2 is a frame 3 carrying the registering or counting mechanisms hereinafter referred to. This frame 3 is spaced from the top of the base 1 by distance pieces 3ª and fastened thereto by screws 3ˢ which are inaccessible when the plate 4 is in place.

The counting mechanism is preferably of the "geared" type, that is the motion of one of its numeral wheels is communicated to the next numeral wheel of higher denomination by means of intermittently operated gears. The unit wheel 50 is the prime mover of the series. Each of the wheels is moved in regular order of progression by means of its gear connection with the unit wheel.

Figure 1:
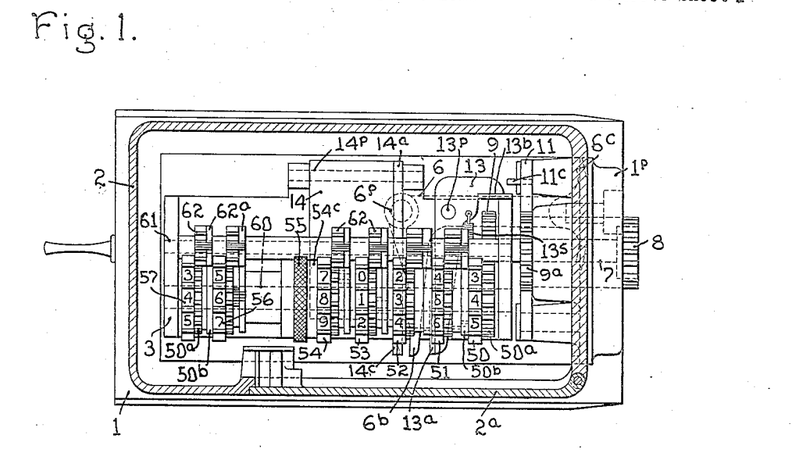
Fig. 1 is a plan view of the registering mechanism in a meter as described in my aforesaid application, the case of the meter being broken away.
Figure 2:
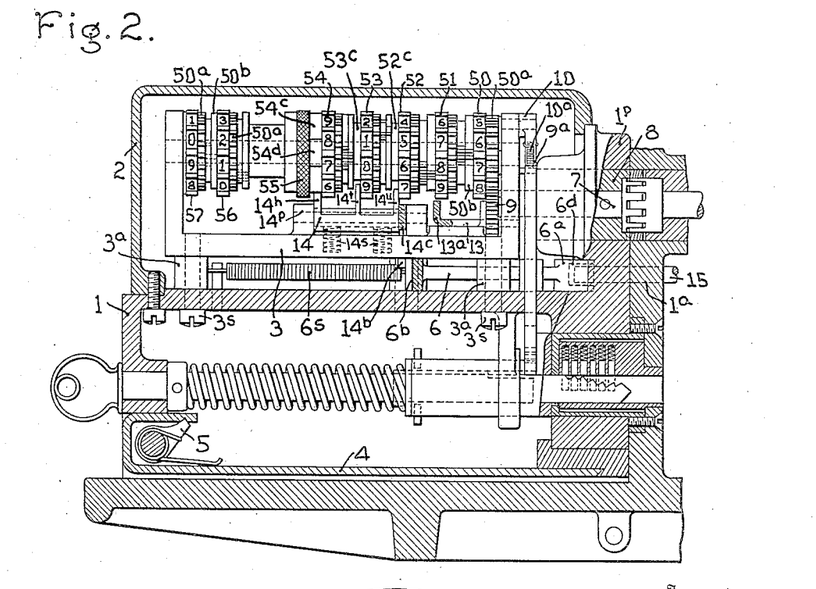
Fig. 2 is a vertical section through Fig. 1, showing the registering mechanism in elevation.

As shown in Figs. 1–2, a series of such numeral wheels 50, 51, 52, 53, 54 are loosely mounted on a spindle 60, supported in the ends of the frame 3. The wheel 50 is the unit wheel of the series and has connected therewith a spur gear 50ª, and a one tooth gear 50ᵇ, securely fastened together and acting as one piece. The gear 50ª of the unit wheel 50 meshes with the spur gear 9 on the drive shaft 7 of the meter, consequently any motion of this shaft 7 (which is coupled by coupling 8 to the mechanism to which the meter is applied) will be communicated to the unit wheel 50, and therefrom to the other numeral wheels in order.

In the example shown there are five numeral wheels 50, 51, 52, 53, 54, in the main counting or registering mechanism. Wheel 50 being the "units" or "cents" wheel; 51 the "tens" wheel; 52 the "hundreds" or "dollar" wheel; 53 the "tens of dollars" wheel; and 54 the "hundreds of dollars" wheel, as hereinafter explained. Each of these wheels is provided with a spur gear 50ª and one tooth gear 50ᵇ either formed integral therewith or secured thereto so that all act as one; similar parts being similarly lettered in the drawings.

Parallel to spindle 50 is a spindle 61 set in the frame 3. Upon this spindle 61 are loosely mounted small pinions 62 each having ten teeth but each alternate tooth is cut or milled away at one end as at 62ª forming 5 "stops" (see Fig. 1). One of these intermediate pinions 62 is placed on spindle 60 adjacent and between each pair of adjacent numeral wheels 50—51; 51—52; 53—54; etc., in such a way that the complete toothed portion of pinion 62 will mesh with the spur gear 50ª of the related numeral wheel of higher denomination, while its stop 62ª will engage the related one tooth gear 50ᵇ of the related numeral wheel of lower denomination (see Fig. 1).

Each one tooth gear 50ᵇ will move its related gear 62 but once during one revolution; and as there are 5 stops in each ten tooth gear 62, such gear 62 is advanced two teeth by and for each revolution of its related gear 50ᵇ, and as each gear 50ª has 20 teeth it follows that any numeral wheel of higher denomination in the series will be advanced $\frac{1}{10}$ of a revolution for each revolution of the numeral wheel of next lower denomination. Thus the numeral wheels will be properly operated in sequence as is required in any consecutive numbering or registering device. The numeral wheels and their carryover devices above described are of well known construction and do not require more detailed explanation or illustration. Further, while I prefer to use this type of construction of registering wheels and carryover devices the invention is not limited thereto, and any other suitable kind of registering wheels and carryover devices could be used.

I have provided novel means for locking said registering mechanism against further operation when it has completed its full count, as explained in my aforesaid application.

If in a counter containing 3 numeral wheels it is desired to subtract instead of to add, the wheels should be set to start at zero (000) which in reality is 1000 as the next number in the series is 999 and when so set it will subtract consecutively a unit at a time till 001 is reached; then the next count (decrease of 1) will bring all the wheels back to zero again (000) which is actual zero this time, as 1000 has been subtracted from the original count. I have therefore provided means for automatically locking the meter at this point (as described in my said application), and when so locked the numeral wheels cannot be shifted until the locking mechanism has been "reset" by hand. The object of this "locking" and "resetting" is fully explained in my aforesaid application.

The particular meter illustrated in the drawings and more fully described in my said application is designed for use on a machine which prints postage stamps of denominations varying from 1¢ to $1.00 consequently the registering mechanism or counter in this meter should be made to lock when the 3 numeral wheels (52, 53, 54) indicating "dollars" come to their zero (0) positions disregarding the positions of the two wheels 50, 51, which indicate "cents".

To each numeral wheel 52, 53, 54, a disk is attached, and preferably placed at the left hand side of such wheel, as shown in Fig. 2. Each disk 52ᶜ, 53ᶜ, 54ᶜ, has a radial slot 50ᵈ in its periphery to admit the related tooth (14ᵘ, 14ᵗ, 14ʰ) of a locking member 14. This locking member 14 is pivoted at one end on a rod 14ᵖ between two upwardly projecting lugs on the floor of the counter frame 3 (see Fig. 1) and the end of said member is normally pushed upward by springs 14ˢ set into sockets in the floor of the frame 3. The outer or free end of this locking member 14 is provided with a series of upwardly projecting teeth 14ᵘ, 14ᵗ, 14ʰ (see Fig. 2) respectively positioned so as to engage with the disks 52ᶜ, 53ᶜ, 54ᶜ, attached to the respective numeral wheels 52, 53, 54, (see Fig. 2). Formed on or attached to one side of the locking member 14 is a plate 14ᵃ (Fig. 1) the outer end 14ᶜ of this plate projecting towards the door 2ᵃ of the meter casing and forms a convenient handle by which the locking member 14 can be depressed by hand, to disengage its teeth from the disks, when resetting the meter. Said plate 14ᵃ also has a downwardly extending portion 14ᵇ (Fig. 2) which extends through a slot in the floor of the frame 3 into the space between the floor of the counter frame 3 and the top of the base 1 into position to engage the meter locking lever 6 hereinafter referred to.

The teeth 14ʰ, 14ᵗ, 14ᵘ of the locking member 14 vary in length relative to the disks 54ᶜ, 53ᶜ, and 52ᶜ with which they make engagement. The tooth 14ʰ which engages the disk 54ᶜ will bear on disk 54ᶜ and hold teeth 14ᵗ and 14ᵘ, clear of their disks 53ᶜ and 52ᶜ (Fig. 2) until tooth 14ʰ enters the slot 54ᵈ in disk 54ᶜ, then the tooth 14ᵗ, the next in length, will bear on the disk 53ᶜ, and holding tooth 14ᵘ clear of disk 52ᶜ until tooth 14ᵗ enters the slot in disk 53ᶜ; then the tooth 14ᵘ bears on disk 52ᶜ until it enters the slot in disk 52ᶜ. Thereupon (there being no further obstruction) the three teeth 14ʰ, 14ᵗ and 14ᵘ enter their respective slots to the full depth and lock the respective numeral wheels at zero.

When the three numeral wheels all show zero at the sight opening (Fig. 15) the teeth 14ʰ, 14ᵗ, 14ᵘ of the locking member 14 are all seated in the slots in the disks 54ᶜ, 53ᶜ, and 52ᶜ, respectively.

When the meter is to be "reset" or "charged" the locking member 14 is pulled down by hand, to disengage the teeth from the disks and release the wheels for further action; and as the numeral wheels 54, 53, 52, cannot be moved by hand the locking member 14 would spring back into engagement with the slots 54ᵈ, 53ᵈ, and 52ᵈ, again, upon releasing the hand pressure on 14, if no obstacle to the teeth 14ʰ, etc., entering the slots intervened. I therefore provide means to prevent the locking member reengaging the numeral wheels after they are released thereby, until the meter has again performed its full cycle of operations. For this purpose I provide a shield 55 (Figs. 1, 2 and 4–7) which may be in the form of a ring and is slidably mounted on the unit of which the numeral wheel 54 forms a part.

Figs. 4 to 7 show in detail the construction of the unit of which wheel 54 forms a part, and which unit consists of the spur gear 54ᵃ, numeral wheel 54, disk 54ᶜ, sleeve 54ˢ, and a one-tooth gear 54ᵇ all of which are formed or rigidly fastened together and operate as one piece. The sleeve 54ˢ has an annular flange 54ᵉ upon the periphery of which a figure "1" is engraved or marked in line with the "0" mark on the wheel 54.

A ring 55 is loosely mounted on sleeve 54ˢ between flange 54ᵉ and disk 54ᶜ, said ring being preferably exteriorly knurled to facilitate its being turned by hand. This ring has an annular portion 55ᵃ on its side surrounding the periphery of flange 54ᵉ, and in this flange is a notch 55ᶜ, to permit the numeral "1" on flange 54ᵉ to be exposed to view when the ring is turned to bring the notch over the numeral, as in Fig. 9.

Figure 7:
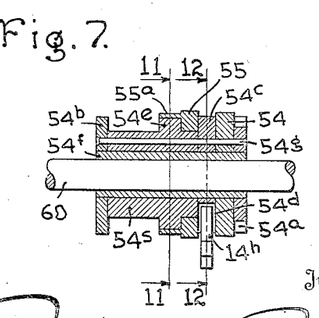
Fig. 7 is a sectional view of Fig. 6 on center line.
Figure 8:
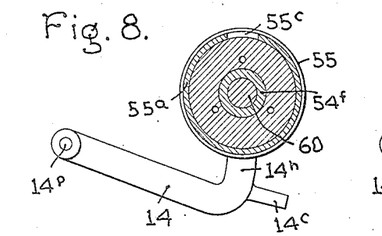
Fig. 8 is a sectional view on line 8—8 Fig. 5.

The ring 55 also has a lug 55ᵇ on its side opposite the part 55ᵃ which lug projects over the periphery of the disk 54ᶜ, this lug 55ᵇ being large enough to completely cover the slot 54ᵈ in the disk 54ᶜ, when in register therewith (Fig. 9) leaving the rest of the periphery of disk 54ᶜ exposed (see Fig. 7).

Figure 10:
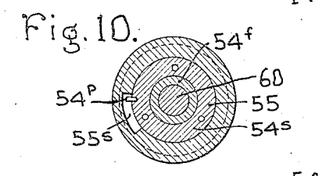
Fig. 10 is a section on the line 10—10 Fig. 5.
Figure 11:
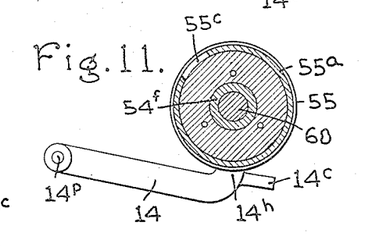
Fig. 11 is a section on the line 11—11 Fig. 7.

A short segmental slot 55ˢ is formed in the inner side of the ring 55, see Fig. 10, and is engaged by a pin 54ᵖ, projecting from the sleeve 54ˢ. This pin and slot limit the extent of rotatorial movement of the ring 55 on sleeve 54ˢ, so it can be moved just sufficient to cause lug 55ᵇ to cover and uncover the slot 54ᵈ, and notch 55ᶜ to expose or hide the numeral 1 on flange 54ᵉ. The notch 55ᶜ and the lug 55ᵇ are so positioned with relation to the disk 54ᶜ and flange 54ᵉ that the numeral 1 on the flange is only exposed to view when the lug 55ᵇ covers the slot 54ᵈ.

Figure 6:
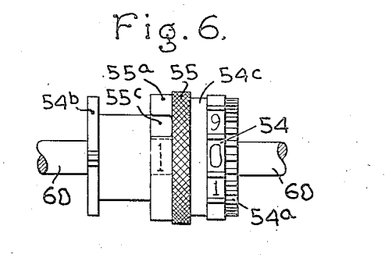
Fig. 6 is a view of same wheel before charging.

Fig. 6 shows the appearance of the "hundred dollar" unit looking down from the dial side of the meter case, just before charging or "setting" the meter, at which time the numeral 1 on flange 54ᵉ is hidden by the rim 55ᵃ of the ring 55. Then the meter is charged or set. The numeral 1 is exposed through the notch 55ᶜ as in Fig. 4.

When the wheel 54 is revolved $\frac{1}{10}$ of a revolution the friction of the ring 55 on the sleeve 54ˢ may not cause ring 55 to turn with it, or, on the other hand, the pressure of the tooth 14ʰ on the lug 55ᵇ may cause the ring 55 to stand still; but in either case the numeral 1 on flange 54ᵉ will be removed from sight on the dial or at the sight opening, and the next time the wheel 54 is turned $\frac{1}{10}$ of a revolution, the ring will be forced to move the flange 54ᵉ by the pin 54ᵖ in slot 55ˢ (Fig. 10) contacting with the end wall of the slot 55ˢ in ring 55, and forcibly moving the lug 55ᵇ out of the way of the tooth 14ʰ, and tooth 14ʰ then contacts directly with the periphery of the disk 54ᶜ (see Fig. 13) and even if the ring 55 (which now "floats" loosely on the part 54ˢ) should be moved by vibration or other cause, the lug 55ᵇ cannot again come between the flange 54ᵉ and the end of the tooth 14ʰ.

Figure 9:
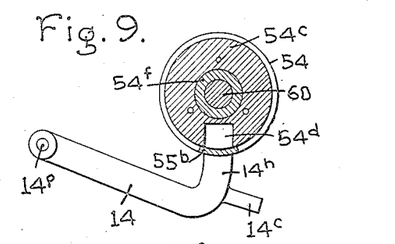
Fig. 9 is a sectional view on line 9—9 Fig. 5.
Figure 12:
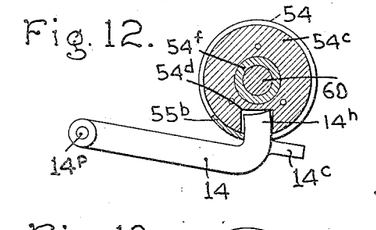
Fig. 12 is a sectional view on the line 12—12 Fig. 7.
Figure 13:
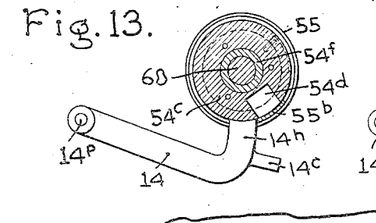
Figs. 13 and 14 are sections similar to Fig. 12 illustrating the action of the shield rock lever during one revolution of the numbering wheels.
Figure 14:
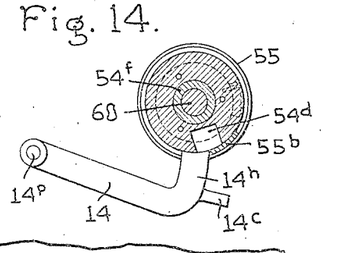

Fig. 9 shows the lug 55ᵇ covering the slot 54ᵈ in disk 54ᶜ with tooth 14ʰ pressing upon it. Fig. 13 shows the disk near the completion of a revolution of the numeral wheel, and the lug 55$^b$ fallen or jarred down so that it again covers the slot 54$^d$. Fig. 14 shows the disk 54$^c$ still further advanced and illustrates how the point of tooth 14$^h$ will push the lug 55$^b$ out of the way until it can enter the slot as illustrated in Fig. 12.

Figure 3:
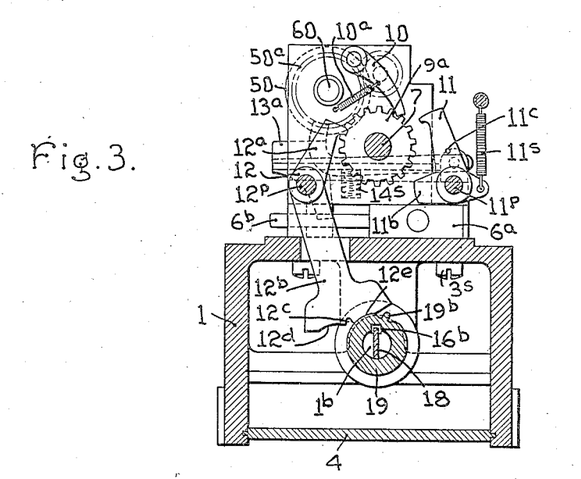
Fig. 3 is a transverse section on the line 3—3 Fig. 1.

To prevent shaft 7 or gear 9 being turned backward so as to reverse the movement of the counter numeral wheels and improperly alter the count registered thereby, a pawl 10, Figs. 2, and 3, is pivoted on the end of the frame 3, beside the gear 9$^a$, and is normally held in engagement with said gear by a spring 10$^a$, thus effectually preventing any backward movement of the shaft 7.

To prevent any unauthorized shifting of or tampering with the numeral wheels of the counter, or improper rotation of the shaft 7, a catch 11 is pivoted at 11$^p$ on the inside back wall of the meter and is normally urged into engagement with the teeth of the gear 9$^a$ by a spring 11$^s$, and is only prevented from taking this position by reason of its lower arm 11$^b$ resting on the shutter lever 6$^a$ (Fig. 3) as described in my said application. This catch 11 engaging gear 9$^a$ prevents its rotation in one direction while pawl 10 prevents rotation of gear 9$^a$ in the opposite direction.

For the purpose of disengaging the latch 11 from the gear 9$^a$ when charging the meter (as described in my said application) a two armed lever 13 (see Figs. 1, 2) is pivoted on the floor of the counter frame at 13$^p$ and provided with a spring 13$^s$ which holds the short arm 13$^b$ of the lever normally tightly against an adjacent part of the counter frame 3; and the long arm 13$^a$ of the lever projects beneath the counter wheels, toward the door of the case 2. When arm 13$^a$ is moved toward the right the short arm 13$^b$ is moved away from the frame 3 and will engage a pin 11$^c$ attached to the catch 11, and thereby move catch 11 out of engagement with the gear 9$^a$.

Below the counter frame 3, in the space provided by the distance pieces 3$^a$ is a two-armed lever 6, pivoted on a stud 6$^p$ and connected with a spring 6$^s$. The longer arm 6$^a$ of this lever 6 extends back toward the wall 1$^p$ of the casing and its extremity is flared out in the form of a sector 6$^a$ centered at the stud 6$^p$. The inside of the wall of the casing base 1 is preferably concaved to fit the convex head 6$^c$ of the lever arm 6$^a$ and allow it to oscillate freely on its pivot 6$^p$. In the head 6$^c$ is drilled a hole 6$^d$ adapted in a certain position of lever 6, to register with a hole 1$^a$ drilled in the inner wall of base 1. When lever 6 is oscillated, hole 6$^d$ in head 6$^c$ is alternately moved into and out of register with hole 1$^a$, and therefore causes head 6$^c$ to alternately obstruct and allow free passage to a pin 15 (see Fig. 2) which is projected into hole 1$^a$ and endeavors to enter the hole 6$^d$ in the head 6$^c$, said head thus constituting a shutter for the hole 1$^a$.

The arm 6$^b$ of the lever 6 extends at a right angle to the arm 6$^a$ toward the door of the meter case 2, its extreme end (see Fig. 1) forming a convenient handle for moving it when charging the meter. To this arm 6$^b$ is connected the spring 6$^s$ which urges it toward the left, but is normally prevented from so moving it by the interposition of the projection 14$^b$ on the locking member 14. (See Figs. 1 and 2.)

When the shutter lever 6 is so positioned that its short arm 6$^b$ rests against the projection 14$^b$ of locking member 14, the hole 6$^d$ in the head 6$^c$ is directly in line with the hole 1$^a$ in the base 1; so that the pin 15 (see Figs. 1 and 2) can enter hole 6$^d$. If however, the projection 14$^b$ is removed as by the raising of the locking member 14, then the spring 6$^s$ will cause the shutter lever 6 to rock on its pivot 6$^p$ and the holes 6$^d$ and 1$^a$ will not register and pin 15 cannot enter hole 6$^d$, and the meter cannot then be effectively operated until reset. These parts being fully described in my aforesaid application.

The total register.

To the left of the subtracting counter above described, and suitably spaced therefrom is the "total" register. This is preferably composed (as shown) of two numeral wheels 56 and 57 (Figs. 1, 2) mounted on the spindle 60 and receiving their motion directly from the last or highest order numeral wheel of the above described counter. In forms of the construction shown the total register is in fact a duplicate of parts of the first counter, but the total register numeral wheels are arranged to add instead of subtract, and the total register shows the sum of the different settings of the subtracting counter.

As shown in the drawing the numeral wheel 56 has a spur gear 50$^a$ having one tooth 50$^b$ adapted to coact with an intermediate pinion 62 which is operated by a one tooth gear 54$^b$ on the sleeve 54$^s$; and motion is transmitted from the unit carrying wheel 54 to the wheel 56 and from the latter to wheel 57 by the same means and in the same manner that motion is transmitted from a numeral wheel of lower denomination to the numeral wheel of the next higher denomination in the subtracting counter as above described; and similar parts being similarly lettered in the drawings, it is unnecessary to enter into a detailed description of the construction and operation of the total register. The numbers on the numeral wheels in the total register however are arranged reversely to the numbers on the wheels in the subtracting counter; so that while the latter starts at the highest number (1000) and subtracts until the zero is reached, the total register will start at zero and add until its highest number is reached.

As above stated and as shown the units wheel 56 of the total register is directly geared to or driven by the "hundreds dollar wheel" 54 of the subtracting counter. Therefore as wheel 56 is directly geared to the wheel 54 wheel 56 will be moved $\frac{1}{10}$ of a revolution for each revolution of the wheel 54. The subtracting counter (in the construction shown) has to be reset for each $1,000.00, therefore the total register will register or add one unit every time the subtracting counter completes its full quota of operations, at which time the registering mechanism will become locked against further effective operations as described in my said application until it is reset or charged.

In practice the subtracting register is "charged" or reset a definite amount at each setting ($1,000.00 in the meter shown). Therefore, the reading of the total register will show the number of times the meter has been charged or reset, and this total multiplied by 1000 (in the meter shown) will show the total amount of postage in dollars which the owner of the meter has paid for.

*Operation of the counter and register.*

As stated, the registering mechanism is shown as part of a meter designed to be removably attached to a machine to register the number of operations thereof, the meter shown being particularly adapted to be attached to a postage meter machine of the type shown in my Patent #1,273,793 and #1,370,668, or other machines of like general character. The particular machine to which this meter is applied is not shown herein as it forms no part of the present invention and therefore need not be described or illustrated herein, except such parts thereof as may come in operative connection with the meter when the latter is properly positioned in the machine. It will suffice to state that such machine is provided with a printing mechanism, with a meter pin 15 and driving connection, and a lock, all adapted to function as described in my said application.

When the meter is used in connection with such a machine the meter is supposed to be taken to the Post Office Department and (if the meter has a subtracting counter as shown) the owner purchases one thousand dollars worth of postage and the post office official will set the subtracting meter to show the full amount of $1000 at the sight opening. The post office official then seals the meter and when so set the meter can be replaced on the machine and the latter operated as desired until practically the full amount of $1000 postage has been used by printing stamps to that amount by successive operations of the machine. The subtracting counter cannot be operated unless the meter is in place on the machine, as when removed therefrom the meter is automatically locked as hereinafter explained. When the meter is in place on the machine, the unit wheel of the subtracting counter will be operated for each operation of the machine.

If it is desired to have the meter set for a larger amount of postage more numeral wheels would have to be used in the subtracting counter. If it is desired to have a less amount of postage sold for each setting, less numeral wheels could be employed in the subtracting counter. In the example shown five numeral wheels are used in the subtracting counter and therefore $1000 worth of postage is presumed to be purchased at each setting of the meter. This capacity is governed by the number of figure wheels in the counter, each additional wheel after the first increasing the capacity ten times; for instance, five wheels would have a maximum capacity of $999.99 but by utilizing the five ciphers as they come into position the real capacity of the counter is equivalent to $1000.00—the figure 1 not appearing. To provide for this contingency the auxiliary figure 1 is engraved at a certain point on the periphery of the extension or hub of the last wheel 54 of the counter and such auxiliary figure 1 automatically becomes visible upon moving the lug 55$^b$ against which the last tooth 14$^t$ (to the left) on the locking comb rests, down each time the meter is recharged. As the five ciphers disappear the five 9's appear instead, and the auxiliary figure 1 just mentioned disappears beneath the circular shield and the figure 1 on the units wheel of the ascending or total counter to the left appears.

The ascending or total counter operates in an ascending series and its only function is to indicate the number of times the dollar and cents counter has been set to capacity and at the same time indicate the total amount of money paid for postage to date, the figures on the dollars and cents counter always indicating the amount of money still available before the meter locks. For instance, if the total register has two wheels and the dollars and cents counter has five wheels, and the meter has been set or recharged 23 times it would show that the mailer had paid $23,000 to date, and still had to his credit in the meter whatever amount might be shown on the subtracting counter. In other words, the total register would have a capacity of showing up to 99 separate and successive purchases of $1000 worth of postage at each purchase.

If the subtracting or dollars and cents counter had only 4 wheels two of them representing cents, and the total register had two wheels and read 23 it would mean that the meter had been reset 23 times for the capacity of $100 each—this would be the same as saying the mailer had paid for $2300 worth of postage to date with whatever balance might be indicated. In other words, the total register not only indicates the number of times the meter has been "set" but also the total amount in dollars of the postage paid for.

With a geared counter and suitable connections it would be possible to print any denomination of stamp desired—from 1¢ to $1.00 on one stamp, with greater ease and positive action than with a ratchet counter of either the external or internal type of movement and subtract the amount of postage used at each operation from the total appearing at the "sight" opening of the subtracting counter.

*Operation of "charging" or setting the meter.*

Figure 15:
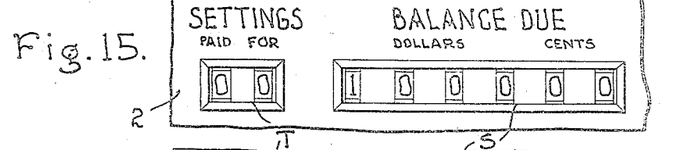
Figs. 15 and 16 show various readings of the numeral wheels at the sight openings at different steps in the operation of the meter.

As described in my said application, the meter is originally set at zero; the numeral wheels all showing "00" at the "total" sight opening "T" (Fig. 15) and "000.00" at the subtracting counter ("dollar and cents") sight opening "S" (Fig. 15). The teeth of the locking comb 14 will then be fully engaged with the notched disk wheels 54, 53, and 52, and the hole 1$^a$ in the back wall of the meter will be closed by the shutter lever head 6$^b$ and the catch 11 engaged with the gear 9$^a$; in other words, the meter and counters will be effectually locked against operation.

Figure 4:
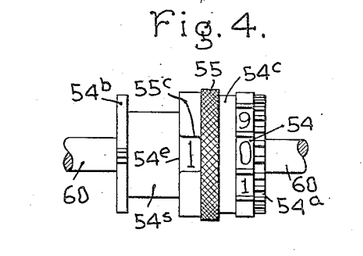
Fig. 4 is a top view of the extreme left hand or highest denomination wheel of the dollar and cents counter as it appears when the meter is charged.
Figure 5:
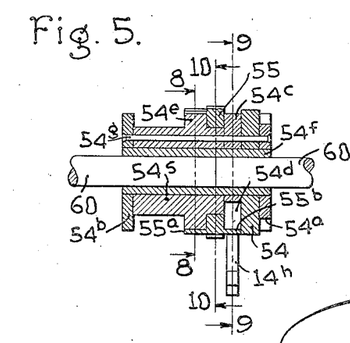
Fig. 5 is a sectional view of same on center line.

Upon opening the door 2$^a$ of the case 2, the three levers 13$^a$, 6$^b$ and 14$^c$ and the knurled ring 55, are accessible. The lever 13$^a$ is then moved to the right causing its short arm 13$^b$ to engage the pin 11$^c$ and push the catch 11 out of engagement with the teeth of the gear 9$^a$, and lifting its lower arm 11$^b$ clear of the path of the shutter lever arm 6$^a$. Next the arm 6$^b$ of lever 6 is moved to the right, this will cause the shutter arm 6$^a$ to move head 6$^b$ into the position where its hole 6$^c$ lines up with hole 1$^a$ in the wall of the meter. Next, by means of the handle 14$^c$, the locking member is moved downward disengaging the teeth 14$^h$, 14$^t$, and 14$^u$ from the slots in the disks of numeral wheels 54, 53, 52; and this downward movement of locking member 14 causes its projection 14$^b$ to extend below the counter frame 3 and prevents the lever 6 from being returned to normal position by its spring 6$^s$. Finally the knurled ring 55 is turned so as to cause lug 55$^b$ to cover the slot 54$^d$ in the disk 54$^c$ of wheel 54 and prevent the re-entry of the tooth 14$^h$ of the locking member 14 into said slot and hold the locking member depressed against the action of its springs 14$^s$; and the teeth 14$^t$ and 14$^u$ will also be held clear of the slots in their related disks. The turning of the ring 55, to cause lug 55$^b$ to cover the slot 54$^d$ moves the notch 55$^c$ to position to expose the "1" engraved on the periphery of the flange 54$^e$ (Fig. 4). The subtracting counter numeral wheels will now show 1000.00 at the sight opening S, (see Fig. 15). This figure "1" appearing at the sight opening is proof that the meter has been properly "set"; it also shows that $1000 in postage has been paid for and can be used instead of leaving it to be inferred, as would have to be the case if only "000.00" appeared at the sight opening of the subtracting counter after the "setting" or charging; the dial would also read exactly the same both before and after charging, if it were not for the introduction of the extra figure "1" just mentioned and as shown in Figs. 4 and 6.

*The automatic locking of the meter.*

Figure 16:
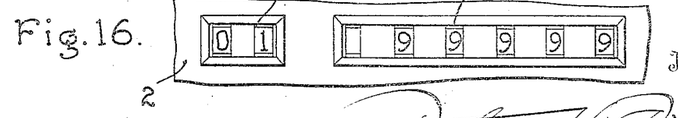

When the meter is operated the first unit of one cent will subtract 1 from the $1000.00 shown on the dial. This means that all five figure wheels will be moved $\frac{1}{10}$ revolution and will read 999.99 at opening S (see Fig. 16) the flanges 54$^e$ being connected with the numeral wheel 54, will also revolve $\frac{1}{10}$ revolution moving the figure 1 engraved upon it out of sight on the dial. The unit wheel 56 of the "total" register will also be moved $\frac{1}{10}$ revolution hiding the 0 and bringing the 1 into view on the dial. The reading at the sight opening T of the total register will then be "01" (see Fig. 16) and at the sight opening S of the subtracting counter will be 999.99.

When the numeral wheel 54 has been turned until the tooth 14$^h$ enters the slot 54$^d$ the next tooth 14$^t$ of the locking member 14 rests on the periphery of the disk 54$^c$ of numeral wheel 53 and will enter the slot 53$^d$ therein the next time it registers therewith, which will be when the subtracting counter shows 009.99.

The last tooth 14$^u$ will now rest on disk 52$^c$ and when the slot 52$^d$ therein registers with the tooth 14$^u$, which will happen when the dial reads 000.99 or less all obstructions will be removed and all the teeth 14$^h$, 14$^t$, and 14$^u$ will enter their respective slots to the full depth and the locking member 14 will rise to its limit, drawing up with it the downwardly projecting lug 14$^b$.

When the lug 14$^b$ is drawn up out of the way of lever 6 spring 6$^s$ would oscillate the shutter lever 6 on its pivot 6$^p$, but is prevented from immediately so doing by reason of the meter pin 15 being at the moment entered in the hole 6$^d$ of the head 6$^b$ of shutter lever arm 6$^a$ of said lever, said pin 15 as explained in my said application, being only withdrawn from the meter at the completion of the then occurring printing operation of the machine to which the meter is attached. But as soon as pin 15 is withdrawn, the lever 6 is moved by spring 6ˢ throwing the hole 6ᵈ out of register with the hole 1ᵃ in the end wall of the meter, so that pin 15 cannot again re-enter it. Also when lever 6ᵃ is thus rocked, the lower arm 11ᵇ of catch 11, which was upheld by the lever arm 6ᵃ is released, and the catch is rocked by its spring 11ˢ, and its upper arm 11ᵃ brought into engagement with the gear wheel 9ᵃ, thus locking the drive shaft 7 of the meter, and the hole 1ᵃ being closed the meter pin 15 cannot enter.

What I claim is:

1. For a counter, a numeral wheel having a slot, and a sleeve having a numeral "1" in line with the "0" of the wheel, the number "1" and slot being relatively so disposed that when the number is exposed the slot is closed.

2. For a counter, a numeral wheel having a slot and a sleeve having a numeral "1" in line with the "0" on the wheel, the number "1" and slot being relatively so disposed that when the number is exposed the slot is closed, with means whereby the numeral is covered and the slot uncovered upon the initial operation movement of the wheels.

3. In a counter, a numeral wheel having a sleeve and a radial slot, a number "1" on the sleeve in line with the "0" on the wheel and a ring on the sleeve having a flange adapted to cover the number "1" but provided with a notch whereby said number may be uncovered.

4. In mechanism as set forth in claim 3, the ring having a lug the notch and lug on the ring being relatively so disposed that when the number 1 is exposed through the notch in the ring the lug covers the slot in the wheel.

5. A counter having the wheel of higher denomination provided with a sleeve, a numeral 1 on this sleeve in line with the numeral 0 of the wheel, a member mounted on the sleeve adapted to uncover the said numeral 1 when in one position, and means whereby the movement of the member is limited to cover or uncover said numeral 1.

6. In a meter for the purpose specified, a counter comprising a series of numeral wheels, mechanism for operating the units wheel, means for carrying over from a wheel of lower denomination to the wheel of next higher denomination, and means for locking the numeral wheels when they have reached predetermined positions, said means having a tooth adapted to enter a slot in the wheel of higher denomination to lock said wheel, and a ring on said wheel having a lug adapted to be adjusted to cover said slot and prevent the tooth locking member entering it when the counter is reset.

7. For a counter, a numeral wheel having a sleeve and a slot, a numeral "1" on the sleeve in line with the number "0" on the wheel, a locking member adapted to engage the slot to lock the wheel and a member on the sleeve adapted to cover or uncover said number 1 and also adapted to prevent the locking member engaging the slot when the counter is initially set for operation.

8. In mechanism as set forth in claim 7, the number "1" and slot being relatively so disposed that when the number is exposed the slot is closed, and means whereby the member is caused to cover the numeral and uncover the slot upon the initial operation movement of the wheels.

9. In a counter, a numeral wheel having a sleeve and a radial slot, a number "1" on the sleeve in line with the "0" on the wheel, a locking member having a tooth adapted to engage the slot and lock the wheel when it has made a complete revolution, and a ring on the sleeve having a flange adapted to cover the number "1" but provided with a notch whereby said number may be uncovered, said ring also having a lug adapted to cover the slot to prevent the locking member engaging therewith when the counter is initially set for operation.

10. In mechanism as set forth in claim 9, the notch and lug on the ring being relatively so disposed that when the number 1 is exposed through the notch in the ring the lug covers the slot in the wheel, and means whereby the ring is caused to be shifted to cover the numeral and uncover the slot upon initial operative movement of the wheels.

11. In a meter for the purpose specified, a counter comprising a series of numeral wheels, a numeral "1" displayed in line with the numeral "0" on the wheel of highest denomination when the counter is set, means whereby the said numeral "1" is covered on the initial shifting of the wheels, said means comprising a ring having a notch adapted to uncover said numeral "1" when the ring is turned in one position, and means whereby the movement of the ring is limited to cover or uncover said numeral "1".

12. In a register numeral wheels, a locking comb having teeth of unequal length respectively adapted to engage the related numeral wheels as they reach "zero"; a member attached to the numeral wheel of highest denomination adapted to prevent the tooth of the locking comb engaging such numeral wheel when the register is charged; means whereby said member is withdrawn upon the initial advance movement of said wheel, so that when the wheel again arrives at zero position the tooth can engage same, said numeral wheel of highest denomination having an auxiliary figure 1 beside the "0" mark, means whereby the auxiliary numeral is displaced when said numeral wheel is adjusted to zero position, and means whereby the auxiliary numeral is covered upon the initial operation of the register.

13. In a meter for the purpose specified, a counter comprising a series of numeral wheels, a numeral "1" displayed in line with the numeral "0" on the wheel of highest denomination when the counter is set, means whereby the said numeral "1" is covered on the initial shifting of the wheels, said numeral wheel of highest denomination having an auxiliary figure 1 beside the "0" mark, and said member being mounted on said numeral wheel and having a slot adapted to uncover the auxiliary numeral when the numeral wheel is adjusted to zero position, and means whereby the device is shifted so as to cover the auxiliary numeral upon the first operation of the register, substantially as described.

14. A counter having a wheel of higher denomination provided with a sleeve, an auxiliary numeral 1 on this sleeve in line with the numeral "0" of the wheel, and means adapted to cover the said auxiliary numeral "1" in one position, and to uncover same in another position.

15. A counter having a wheel of higher denomination provided with an auxiliary numeral 1 in line with the numeral "0" of the wheel, and a rotatable member adapted to cover the said auxiliary numeral "1" in one position, and to uncover same in another position.

16. A counter having numeral wheels, a locking device adapted to engage the numeral wheels as and when they arrive at "zero"; a member adapted to prevent the locking device engaging the numeral wheel of highest denomination when the register is charged; means whereby said member is withdrawn upon the initial advance movement of said wheel so that when said wheel again arrives at "zero" position the locking device can engage same, the numeral wheel of highest denomination having an auxiliary figure "1" beside the "zero" mark; and the member being adapted to permit the display of said auxiliary numeral 1 when said numeral wheel is in zero position, and to cover the auxiliary numeral upon the initial operation of the register.

17. A register having numeral wheels, a locking member adapted to engage the numeral wheels as and when they arrive at "zero"; a sleeve rotatably mounted on the numeral wheel of highest denomination and adapted to prevent the locking member engaging such numeral wheel when the register is charged; and means whereby said sleeve is shifted upon the initial advance movement of said wheel so that when the wheel again arrives at "zero" position the locking member can engage same.

18. In registering mechanism as set forth in claim 17 said numeral wheel of highest denomination having an auxiliary figure 1 adjacent the "zero" mark, and the said sleeve having a notch adapted to permit the display of said auxiliary numeral when said numeral wheel is in zero position and to obscure the auxiliary numeral upon the initial operation of the register.

19. In mechanism of the character specified, a set of numeral wheels, means for carrying over from one numeral wheel to the other, the numeral wheel of the highest denomination in the set having an auxiliary numeral "1" beside the numeral "0" thereon; an adjustable sleeve on said wheel; and means whereby when the numeral wheels are all adjusted to "0", the sleeve is shifted so that the auxiliary numeral "1" indicating the next still higher denomination is displayed; and means whereby the sleeve is shifted upon the first operation of the register after such setting operation to obscure the auxiliary numeral.

In testimony that I claim the foregoing as my own I affix my signature.

ARTHUR H. PITNEY.